United States Patent [19]
Sugden

[11] Patent Number: 6,008,615
[45] Date of Patent: Dec. 28, 1999

[54] COMMUTATION CONTROLLER

[75] Inventor: David Mark Sugden, Leeds, United Kingdom

[73] Assignee: Switched Reluctance Drives Limited, Harrogate, United Kingdom

[21] Appl. No.: 09/210,310

[22] Filed: Dec. 11, 1998

[30] Foreign Application Priority Data

Dec. 12, 1997 [GB] United Kingdom ................. 9726397

[51] Int. Cl.⁶ ..................................................... H02P 1/46
[52] U.S. Cl. ........................................... 318/701; 318/439
[58] Field of Search .................................. 318/138, 254, 318/439, 701, 150–158, 376, 743

[56] References Cited

U.S. PATENT DOCUMENTS

| 4,179,729 | 12/1979 | Stanton et al. | 363/175 |
| 5,650,779 | 7/1997 | Sugden | 341/9 |
| 5,652,494 | 7/1997 | Sugden | 318/701 |
| 5,786,676 | 7/1998 | Ogawa et al. | 318/468 |

FOREIGN PATENT DOCUMENTS

| 0 456 828 A1 | 11/1991 | European Pat. Off. . |
| 0 573 198 A1 | 8/1993 | European Pat. Off. . |
| 0 735 664 A2 | 2/1996 | European Pat. Off. . |
| 0 735 664 A3 | 3/1997 | European Pat. Off. . |

OTHER PUBLICATIONS

"The Characteristics, Design and Applications of Switched Reluctance Motors and Drives", by Dr. J.M. Stephenson and Dr. R.J. Blake, PCIM '93 Conference & Exhibition, Nurnberg, Germany, Jun. 21–24, 1993, pp. 1–68.

*Primary Examiner*—Robert E. Nappi
*Assistant Examiner*—Rina I. Duda
*Attorney, Agent, or Firm*—Patterson & Keough, P.A.

[57] ABSTRACT

A commutation controller for a switched reluctance machine has separate timer circuits for determining the firing signals for motoring and generating modes. Each timer circuit comprises a ramp generator and a pair of comparators which denote the ON- and OFF-angle as the ramp output passes preset thresholds applied to the comparators. A multiplexer selects the output from one of the motoring and generating timers according to the mode of machine operation. By producing timing signals for the motoring and generating modes separately and continuously, a transition between motoring and generating modes can be carried out smoothly without timing error.

19 Claims, 9 Drawing Sheets

Fig 1

Prior Art

Fig 2

Prior Art

Fig 3

Prior Art

Fig 4(a)

Prior Art

Fig 4(b)

Prior Art

Fig 5

Prior Art

Fig 6

Prior Art

COMMUTATION CONTROLLER

BACKGROUND OF THE INVENTION

1. Field of the Invention

The present invention generally relates to a commutation controller for an electronically commutated electrical machine and, in particular, to such a control system for a switched reluctance machine.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, the energization of the phase windings occurs at a controlled frequency. This type is generally referred to as a synchronous reluctance machine. It may be operated as a motor or a generator. In a second type of reluctance machine, circuitry is provided for detecting the angular position of the rotor and energizing the phase windings as a function of the rotor position. This second type of reluctance machine is generally known as a switched reluctance machine. It too may also be a motor or a generator. The characteristics of such switched reluctance machines are well known and are described in, for example, "The characteristics, design and application of switched reluctance motors and drives" by Stephenson and Blake, PCIM'93, Nurnberg, Jun. 21–24, 1993, which is incorporated herein by reference.

Figure 1:
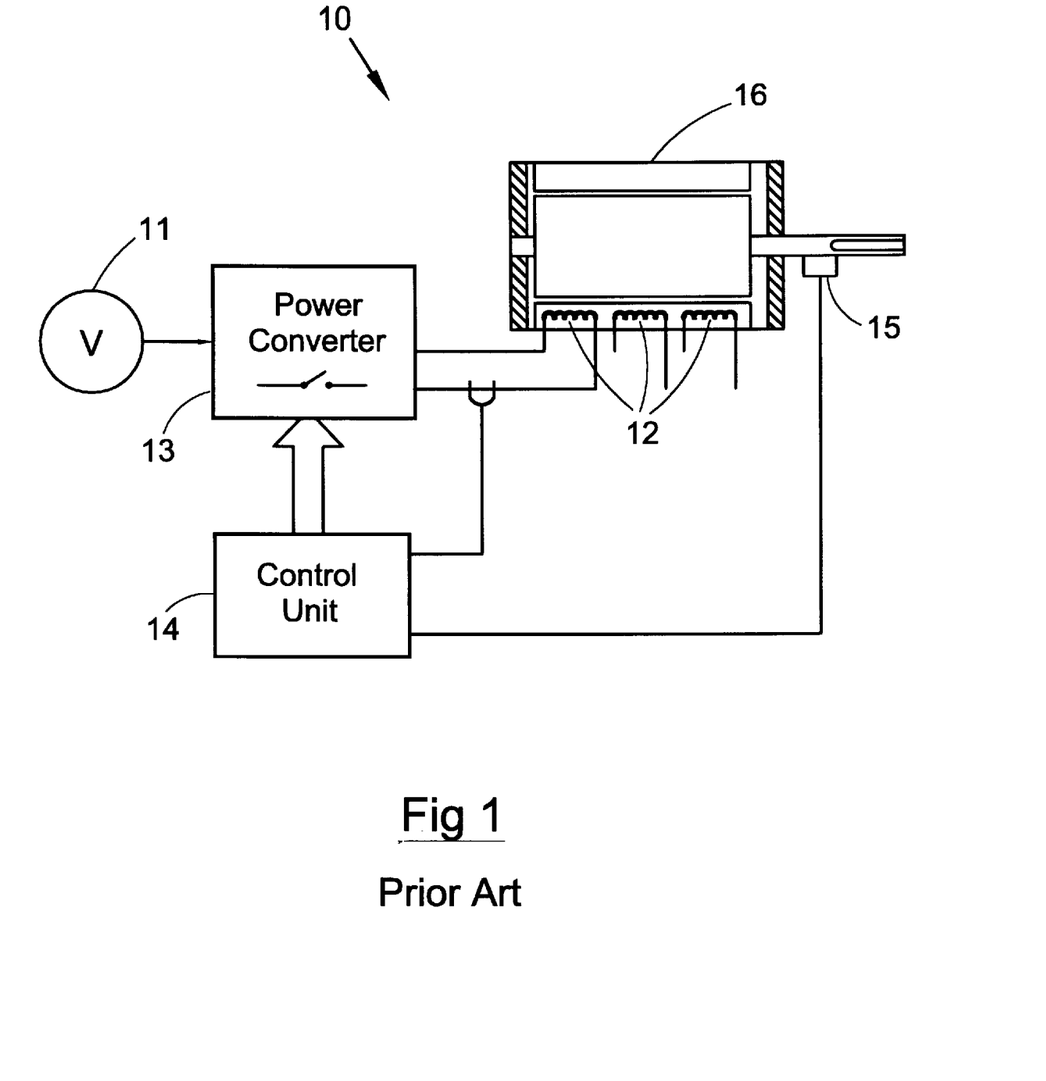
FIG. 1 shows the principal components of a switched reluctance system.

FIG. 1 shows the principal components of a typical switched reluctance system 10. The input DC power supply 11 can be either a battery or rectified and filtered AC mains. The DC voltage provided by the power supply 11 is switched across the phase windings 12 of the machine 16 by a power converter 13 under the control of an electronic control unit 14. The switching must be correctly synchronized to the angle of rotation of the rotor for proper operation of the switched reluctance system 10. A rotor position detector 15 is typically employed to supply signals corresponding to the angular position of the rotor. The output of the rotor position detector 15 may also be used to generate a speed feedback signal.

The rotor position detector 15 may take many forms, for example it may take the form of hardware, as shown schematically in FIG. 1, or of a software algorithm which calculates the position from other monitored parameters of the drive system, for example as described in EP-A-0573198 (Ray), which is incorporated herein by reference. In some systems, the rotor position detector 15 can comprise a rotor position transducer that provides output signals that change state each time the rotor rotates to a position where a different switching arrangement of the devices in the power converter 13 is required.

Timing of the energization of the phase windings in a switched reluctance machine depends heavily on accurate detection of the angular position of the rotor. The importance of accurate signals from the rotor position transducer 15 may be explained by reference to FIGS. 2 and 3, which explain the switching of a reluctance machine operating as a motor.

Figure 2:
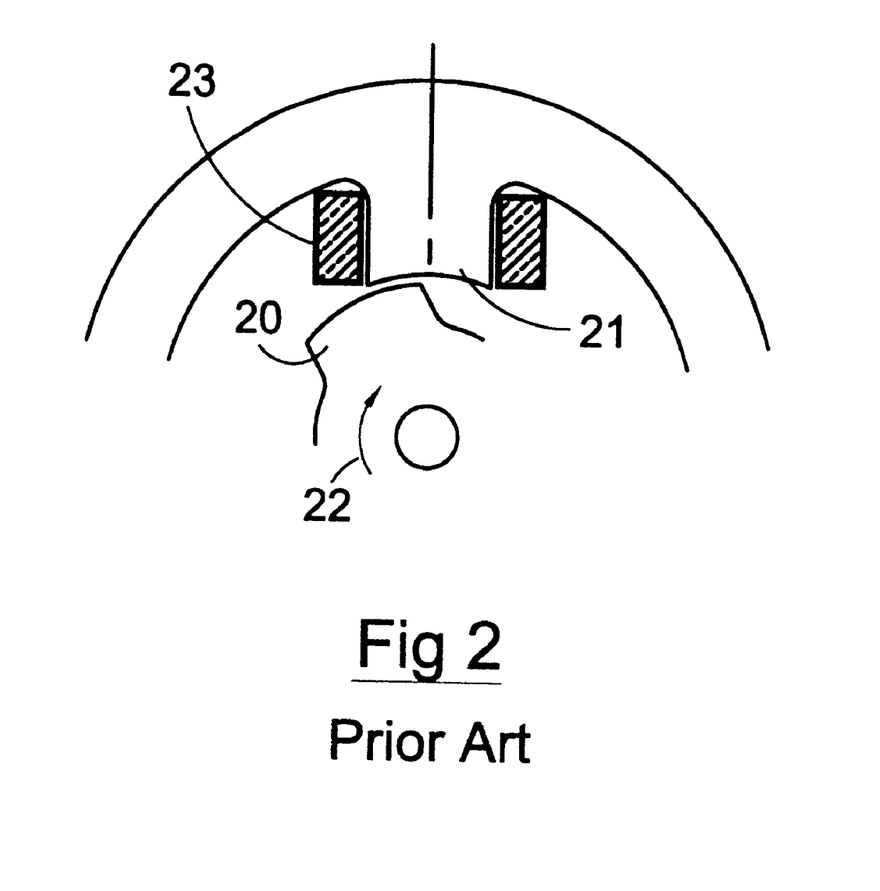
FIG. 2 shows a schematic diagram of a rotor pole approaching a stator pole in a reluctance machine.
Figure 3:
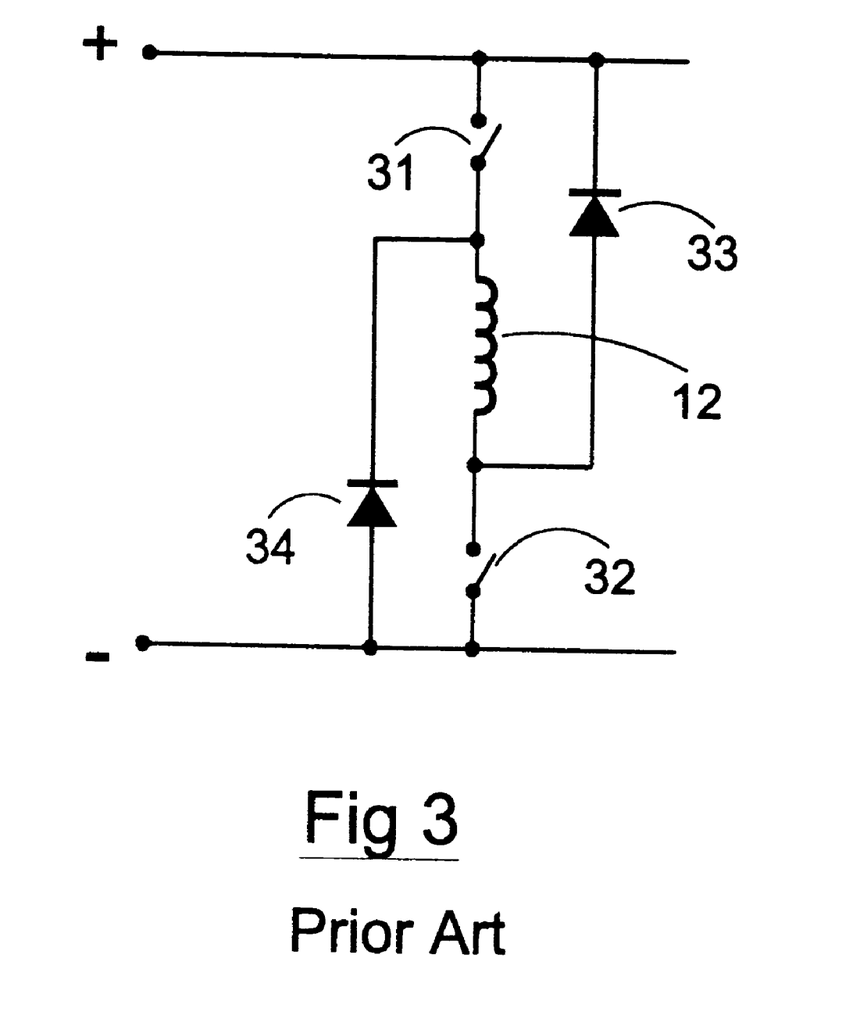
FIG. 3 shows typical switching circuitry in a power converter that controls the energization of the portion of the phase winding associated with the stator pole of FIG. 2.

FIG. 2 generally shows a rotor pole 20 approaching a stator pole 21 according to arrow 22. As illustrated in FIG. 2, a portion 23 of a complete phase winding 12 is wound around the stator pole 21. As discussed above, when the portion of the phase winding 23 around stator pole 21 is energized, a force will be exerted on the rotor, tending to pull rotor pole 20 into alignment with stator pole 21. FIG. 3 generally shows typical switching circuitry in the power converter 13 that controls the energization of the portion 23 of the phase winding 12 around stator pole 21. The circuit comprises first and second switches 31/31 and a return diode 33 and 34 for each switch. When the switches 31 and 32 are closed, phase winding 12 is coupled to the source of DC power and the phase winding is energized. Many other configurations of switching circuitry are known in the art: some of these are discussed in the Stephenson & Blake paper cited above.

In general, the phase winding is energized to effect rotation of the rotor as follows. At a first angular position of the rotor (called the turn-on angle, $\theta_{ON}$) the controller 14 provides switching signals to turn on both switching devices 31 and 32. When the switching devices 31 and 32 are on, the phase winding is coupled to the DC supply, causing an increasing magnetic flux to be established in the machine. It is this magnetic flux acting on the rotor pole that produces the motoring torque. As the magnetic flux in the machine increases, current flows from the DC supply through the switches 31 and 32 and the phase winding 12. In some controllers, current feedback is employed and the magnitude of the phase current is controlled by chopping the current by rapidly switching one or both of switching devices 31 and/or 32 on and off. In motoring operation, the turn-on angle is often chosen to be the rotor position where the center-line of an inter-polar space on the rotor is aligned with the center-line of a stator pole, but it may be some other angle.

In many systems, the phase winding remains connected to the DC bus (or connected with chopping if chopping is employed) until the rotor rotates such that it reaches what is referred to as the "freewheeling angle", $\theta_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the return diodes (in this example 34). During the freewheeling period, the voltage drop across the phase winding is small, and the flux remains substantially constant. The circuit remains in this freewheeling condition until the rotor rotates to an angular position known as the "turnoff angle", $\theta_{OFF}$, (e.g. when the centerline of the rotor pole is aligned with that of the stator pole). As with the turn-on angle, the turn-off angle may be chosen to be at some other position.

When the rotor reaches the turnoff angle, both switches 31 and 32 are turned off and the current in phase winding 12 begins to flow through the diodes 33 and 34. The diodes 33 and 34 then apply the DC voltage from the DC bus in the opposite sense, causing the magnetic flux in the machine (and therefore the phase current) to decrease.

Figure 4A:
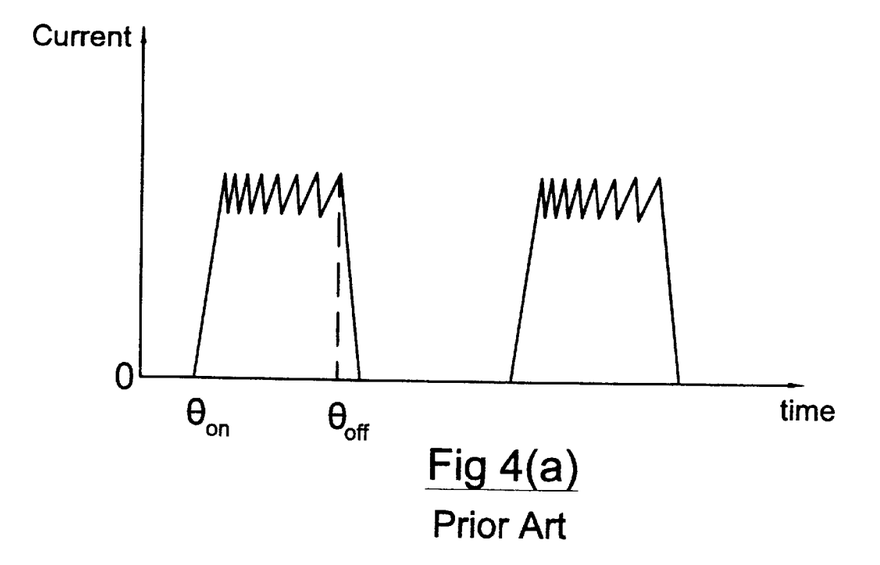
FIGS. 4(a) and 4(b) illustrate typical current waveforms of a switched reluctance system operating in chopping and single-pulse modes respectively.
Figure 4B:
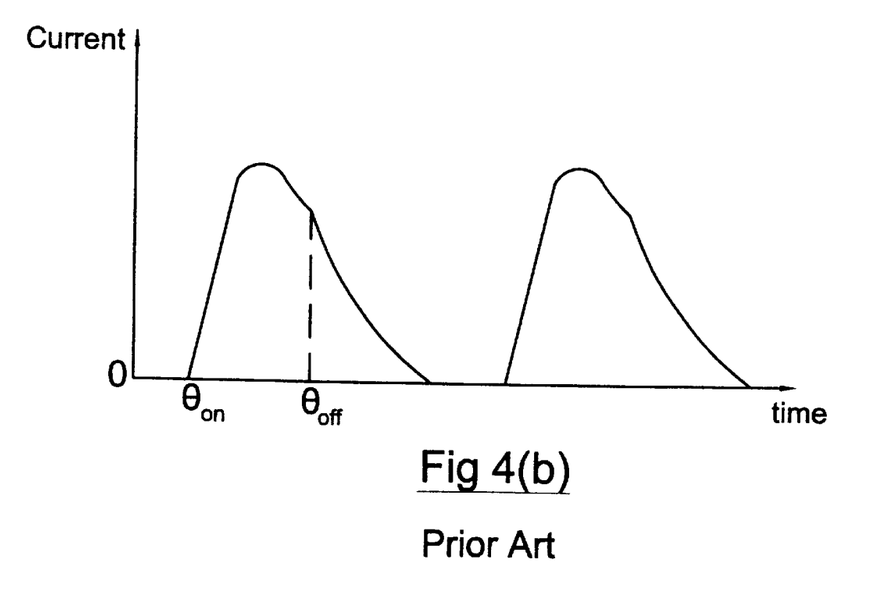

FIG. 4(a) shows a typical current waveform in the chopping mode of operation, where the current is chopped between two fixed levels. As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. FIG. 4(b) shows a typical single-pulse current waveform where the freewheel angle is zero.

It is well known that the values of turn-on, freewheel and turn-off angles for different motor speeds can be predetermined and stored in some suitable format, such as a look-up table, for retrieval by the control system as required, or can be calculated or deduced in real time. In either case, there is a requirement for the appropriate angular position of the rotor to be detected, so that the required switching action can be carried out. In general, this requires either that the position detector itself is sufficiently sophisticated to produce fine resolution of position or that the rotor position detector signals can be interpolated in some fashion to provide position information at fine resolution. The first case involves the use of a relatively complex and expensive position encoder. One example of the second case is described in EP-A-0735664 (Sugden), which is incorporated herein by reference and which uses a high-frequency clock to generate a digital ramp, from which the appropriate angular positions can be interpolated.

Figure 5:
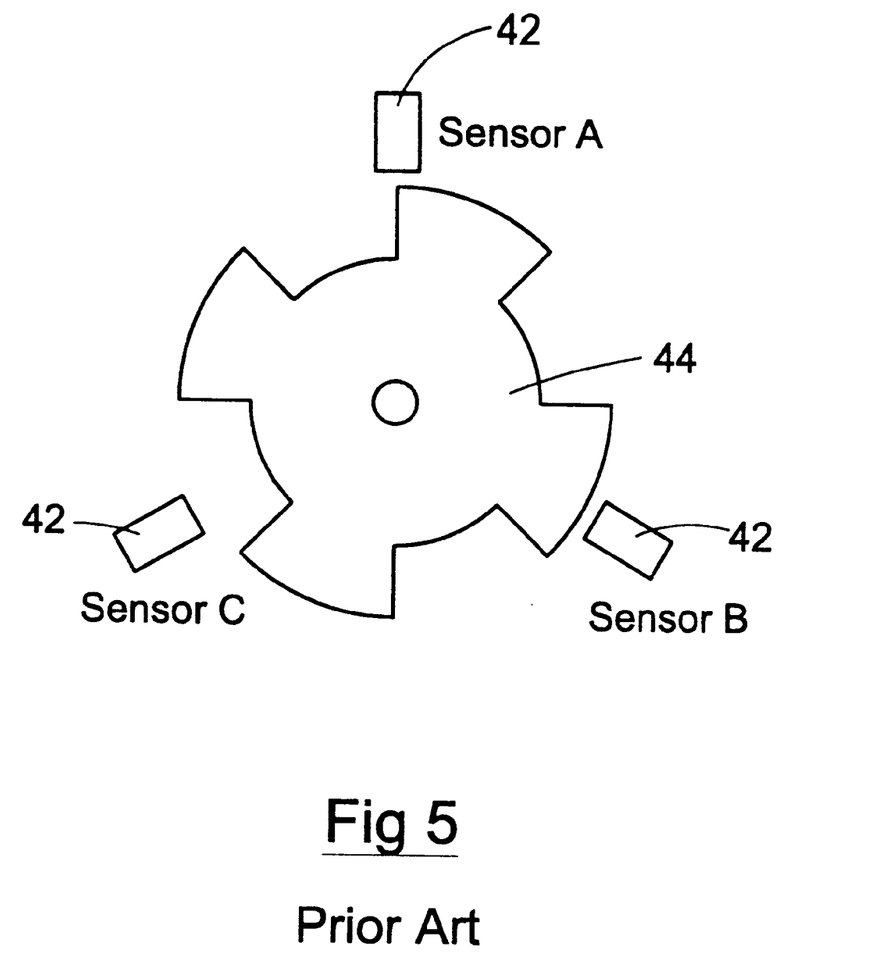
FIG. 5 illustrates a rotor position transducer for controlling the operation of a switched reluctance drive.

In FIG. 5, a rotor position transducer (RPT) 15 is illustrated which uses optical sensors 42 cooperating with a moving vane 44 which has light-interrupting angularly spaced segments on it. The vane 44 rotates with the rotor of the electrical machine, as shown schematically in FIG. 1, causing the sensors to produce high and low outputs as the segments pass each sensor. It will be appreciated that, in this example, the output of each sensor is used to control the energization of a respective phase of the machine winding. Other arrangements are known where the number of sensors is greater or smaller than the number of phases.

Figure 6:
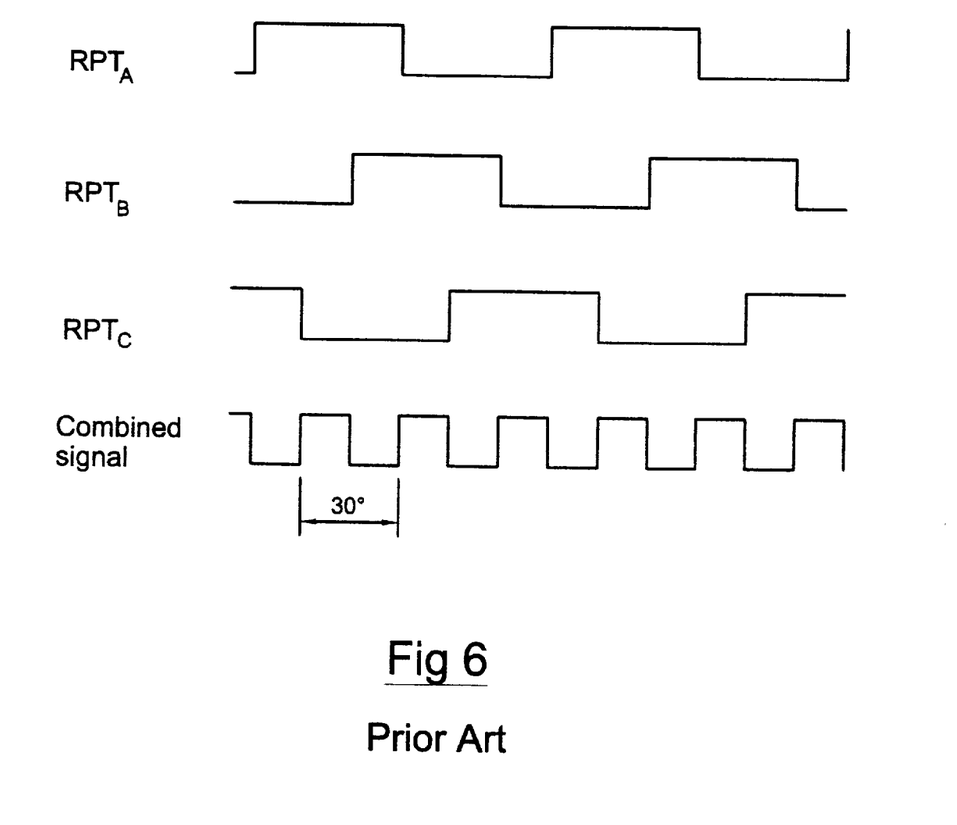
FIG. 6 illustrates the signals which may be generated by the rotor position transducer of FIG. 5.

The controller 14 of FIG. 1 can receive a set of output signals from the RPT and utilize those signals to control the switching of power devices to control the energization of the phase windings of the switched reluctance machine. It does this by observing the pulse trains generated by the sensors 42 of FIG. 5 as the vane 44 rotates. FIG. 6 shows the signals produced by the three sensors 42 of FIG. 5 as the vane 44 rotates at constant speed. FIG. 6 also shows a signal produced by simple logic gating of the three sensor signals so that a rising or falling edge is produced each time there is a transition in one of the three signals.

Figure 7:
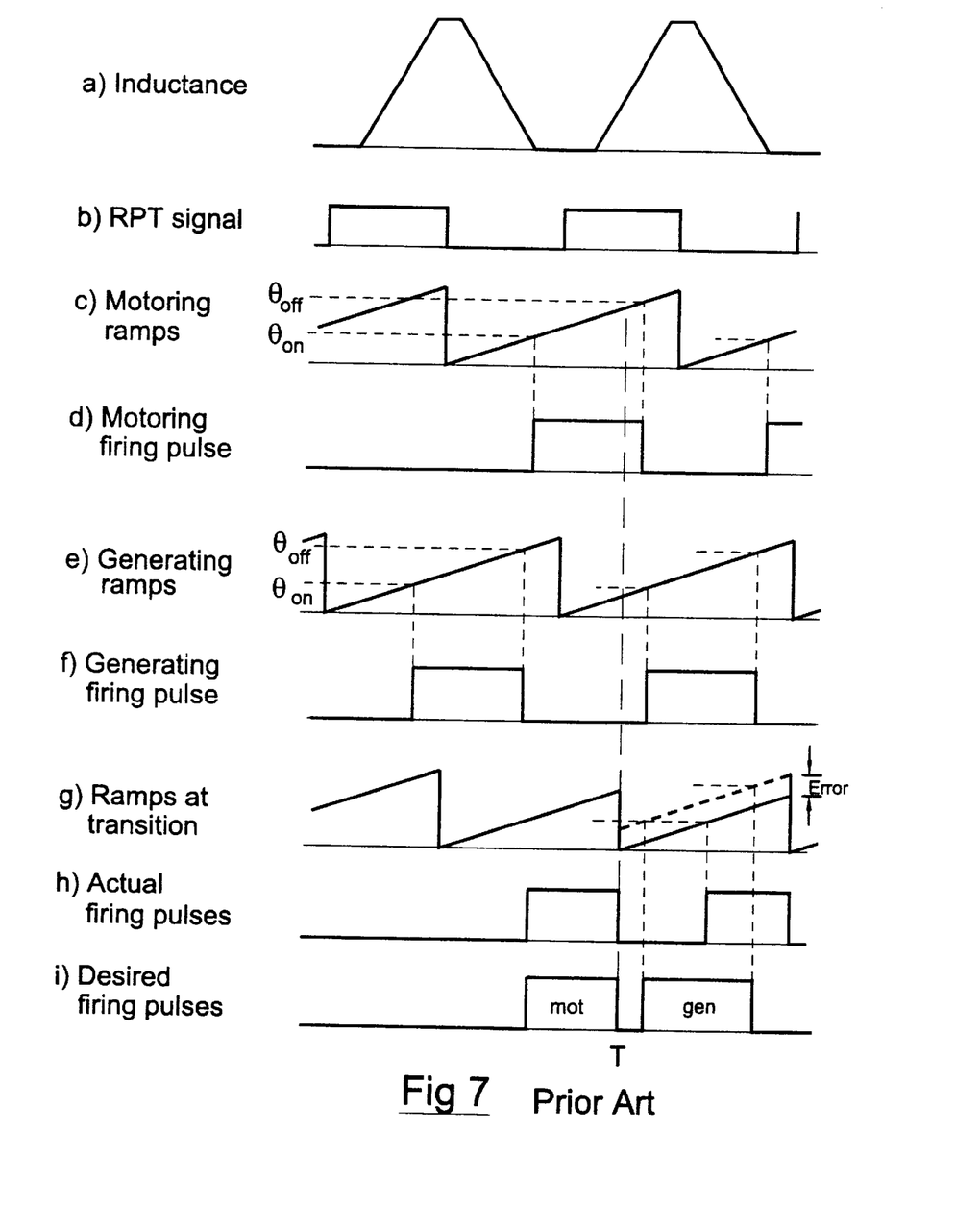
FIG. 7 shows waveforms which are generated in known control systems.

FIG. 7(a) shows the idealized inductance waveform of one phase (e.g. Phase A) of the machine shown in FIG. 1. It will be recognized by those familiar with reluctance machines that it is periodic, with the period defined by the rotor pole pitch. In practice, the corners of the inductance waveform are rounded by second-order effects, such as flux fringing, but such influences are secondary to the operation of the machine. FIG. 7(b) shows the relationship of the signal $RPT_A$ of FIG. 6 to the inductance waveform. The sensor 42 has been aligned relative to the stator poles (and the rotating vane has been aligned relative to the rotor poles) such that it provides transitions in output signal level at the centers of the maximum and minimum inductance regions. These transitions can be used, e.g. as described in the aforementioned EP-A-0735664 (Sugden), to control the timing of the commutation of an electronically commutated machine. If the control angles $\theta_{ON}$ and $\theta_{OFF}$ are specified in terms of voltage levels or digital words, as appropriate, then detection of the points at which the appropriate levels or words are reached can be used to generate the required firing signals for the switching devices, as will now be described.

FIG. 7(c) illustrates a motoring ramp for phase A, comprising a voltage level which rises linearly with rotor angle. The ramp resets at each falling edge of the RPT signal. Two thresholds are set corresponding to the angles $\theta_{ON}$ and $\theta_{OFF}$ at which the phase is energized and, thereafter, de-energized. $\theta_{ON}$ causes the start of a firing pulse when the ramp passes the $\theta_{ON}$ threshold. The firing pulse is maintained until the same ramp passes the $\theta_{OFF}$ threshold. By adjusting the $\theta_{ON}$ threshold, the moment of initiation of the motoring firing pulse is varied. Similarly, by adjusting the $\theta_{OFF}$ threshold, the duration of the firing pulse is varied. FIG. 7(d) illustrates a motoring firing pulse which can be seen to be generated by the transition of the ramp past the $\theta_{ON}$ and $\theta_{OFF}$ thresholds.

FIG. 7(e) illustrates the ramps initiated in a generating mode at the rising edge of the RPT signal. Again, the transition of the ramp past the $\theta_{ON}$ and $\theta_{OFF}$ thresholds determines the start and duration of the generating firing pulses. The pulses are shown in FIG. 7(f).

Systems based on this principal are economical in components and work well in steady state. However, when a transition is made from motoring to generating or vice versa, there is a likelihood of an initially misplaced firing pulse. This can lead to a randomly positioned torque pulse in the machine which can cause acoustic noise and lead to high fault currents. One option is to detect a situation in which a firing pulse will be misplaced in the transition from one mode to the other and to omit that pulse altogether. Control in the selected mode is then only taken up in the next phase in the sequence. The consequence of this is a significant disturbance of the torque due to the temporary prolonged absence of any phase energization at all.

An alternative approach is to inhibit the ramp associated with the initial mode and to start the first ramp of the second mode at the moment of transition between modes. This is illustrated in FIG. 7(g). At angular position T, the command to make the transition from motoring to generating modes cancels the motoring ramp which is immediately succeeded by the generating ramp. However, because the transition occurs between the notionally correct start of the generating ramp and the end of the notionally correct end of the generating firing pulse, the generating ramp does not start in the correct place coincident with the rising edge of the RPT signal. As shown in FIG. 7(h), the result is that the first generating firing pulse is delayed and of a shorter duration due to the error in the magnitude of the ramp at a given rotor position. This is to be contrasted with the desired position and duration of the first generating firing pulse following the transition shown in FIG. 7(i).

It is an object of the present invention to provide a cost-effective method of deriving angular position information under both steady-state and transient conditions and producing reliable firing pulses for an electronically commutated electrical machine.

SUMMARY OF THE INVENTION

According to embodiments of the present invention there is provided a commutation control circuit for an electrically commutated electrical machine having a rotor and a stator, comprising: means for providing signals indicative of the position of the rotor with respect to the stator, a motoring timer responsive to the signals for producing firing pulses for a motoring mode of the machine, a generating timer responsive to the signals for producing firing pulses for a generating mode of the machine, and means for selecting between the firing pulses of the motoring and generating timers to produce commutation signals for commutating the machine in the selected mode.

Embodiments of the invention provide correct commutation because the motoring and generating mode timers act independently of one another. Thus, regardless of the position in a rotor cycle at which transition between modes occurs, commutation in the selected mode will be unaffected by the previous mode.

Embodiments of the invention also extend to a switched reluctance system, comprising: a reluctance machine having a rotor, a stator and at least one phase winding, switch means actuatable to control energization of the or each phase winding, a controller arranged to actuate the switch means, the controller including a commutation control circuit, the switch means being responsive to the commutation signals of the circuit to energize the or each phase winding.

Preferably, the selection between modes is made using a multiplexer.

Preferably, the position detection signal has rising and falling edges and the motoring and generating timers are respectively responsive to one of the rising and falling edges for initiating a ramp in the form of a rising signal value or a count value on which the initiation and termination of the respective firing pulses are based.

Also according to embodiments of the invention there is provided a method of timing commutation in an electrical machine having a rotor and a stator, for motoring or generating, the method comprising:

producing a position detection signal indicative of the position of the rotor with respect to the stator;

producing motoring firing pulses in response to the position detection signal for operating the machine in a motoring mode of the machine;

producing generating firing pulses in response to the position detection signal for operating the machine in a generating mode of the machine; and selecting between the firing pulses of the motoring and generating modes to run the machine in the selected mode.

The method may include producing a continuous sequence of motoring firing pulses at the same time as producing a continuous sequence of generating firing pulses.

The position detection signal may be used to denote predetermined positions of the rotor with respect to the stator at which the initiation and the termination of the firing pulses occur. Alternatively, the initiated firing pulse may be terminated after a delay.

The present invention can be used to provide a low-cost, efficient control system for a switched reluctance drive in both motoring and generating modes. This control system allows for cost-effective control of a switched reluctance drive under transient conditions.

BRIEF DESCRIPTION OF THE DRAWINGS

The present invention can be put into practice in various ways, some of which will now be described by way of example and with reference to the accompanying drawings in which.

DETAILED DESCRIPTION OF PREFERRED EMBODIMENTS

Figure 8:
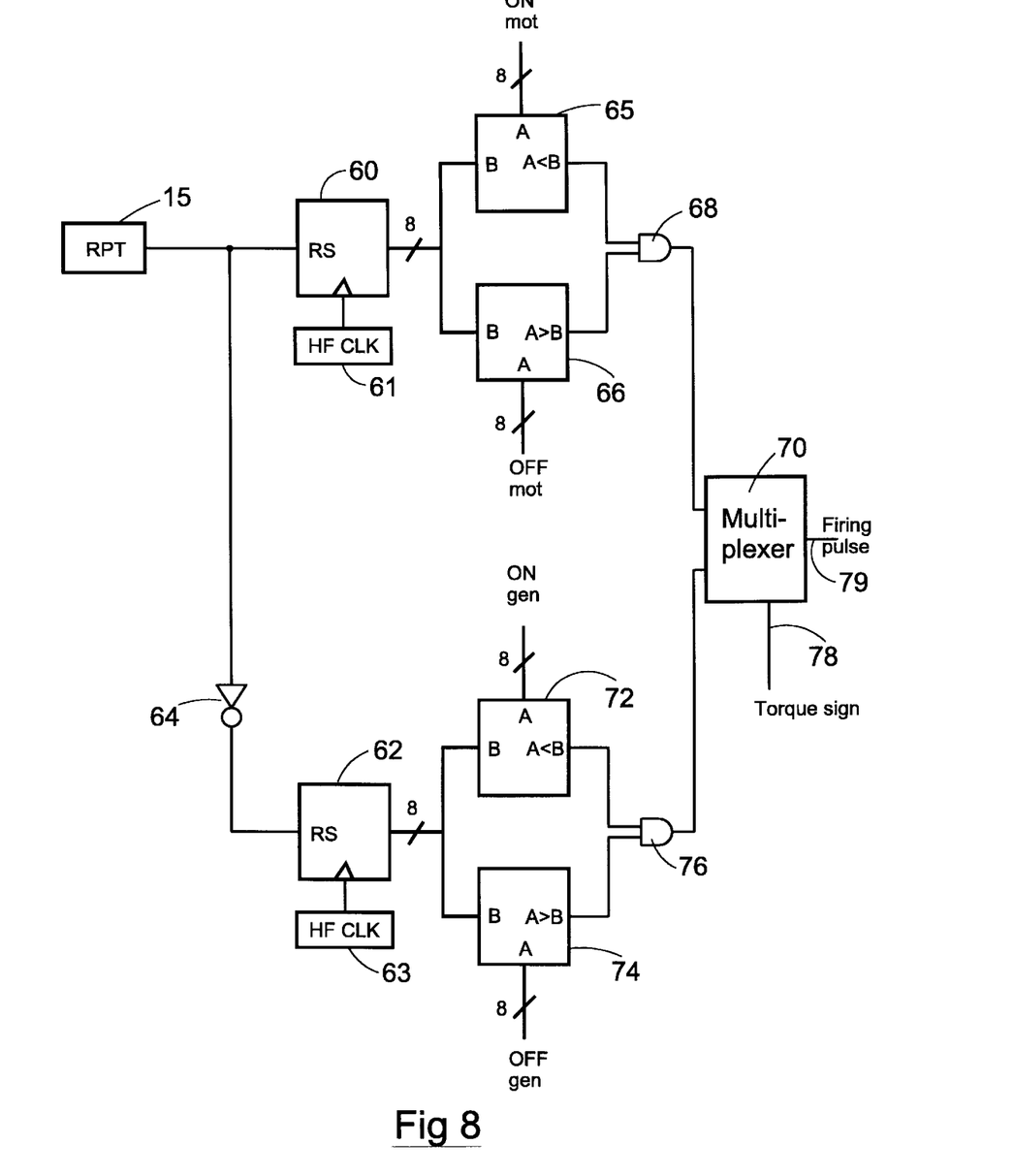
FIG. 8 shows a schematic diagram of a control system according to an embodiment of the invention.

Referring to FIG. 8, a commutation control circuit for one phase of a switched reluctance machine comprises a motoring ramp counter 60 and a generating ramp counter 62. Each counter 60/62 counts pulses from a corresponding high-frequency (HF) clock 61/63. The counter 60 is reset by the falling edge of one of the outputs of the RPT 15 (see FIG. 9(a)) for each of the three phases A, B and C. The counter 62 is reset by the inverted form of the output of the RPT 15 by means of an inverter 64.

One possible embodiment of RPT 15 is as illustrated in FIG. 5. It should be noted that the particular RPT is exemplary only, in that the present invention is applicable to other types and configurations of vanes, sensors and to other forms of position encoders. For example, the number and location of the sensors could be changed to suit a particular application. Moreover, it is not essential that the vane define light-inhibiting and light-transmissive portions. Other types of vanes and sensors could be used. For example, the vane could be constructed of magnetic mark regions and non-magnetic space regions and the sensors could comprise Hall-effect devices. Similarly, the vane could comprise teeth of ferromagnetic material and the sensors could each be a form of reluctance sensor. Furthermore, in the illustrated example, the transitions between marks and spaces in the RPT output are coincident with the centers of maximum and minimum inductance regions in each machine phase cycle. Other positioning of the transitions between marks and spaces in the RPT signal could be used to equal effect, as would be apparent to the skilled person.

The commutator can be implemented as part of the controller 14 of FIG. 1. As such, embodiments of the invention extend to a switched reluctance system incorporating the subject commutator.

The commutator of the present invention can conveniently be split up into two parts for the purposes of description. The motoring part is associated with the counter 60. The generating part is associated with the counter 62. Taking the motoring part, an eight-bit output word from the counter 60 is supplied as an input B to ON-angle and OFF-angle motoring comparators 65 and 66. Each comparator also receives a demand input at A in each case corresponding to the magnitude of the word from the counter 60 at which it is required to switch on or off the energization of the phase being controlled. These ON-angle and OFF-angle signals correspond to the positions $\theta_{ON}$ and $\theta_{OFF}$ referred to in relation to FIG. 4(b). The outputs of the comparators are combined in an AND gate 68 to produce a firing pulse for the switches appropriate to that phase winding of the machine. The resulting motoring firing pulse is shown in FIG. 9(c) in which the rising and falling edges of the firing pulse are coincident with the points at which the counter output transits the two threshold values.

In the generating part of the controller, the inverse of the RPT signal is applied to the counter 62 which produces its own ramp output at the rate of the HF clock input. The generating ramp is initiated on the rising edge of the RPT signal. The increasing eight-bit word from the counter 62 is applied to each of an ON-angle and an OFF-angle comparator 72/74 in a similar manner to that described in relation to the motoring part of the controller.

Figure 9:
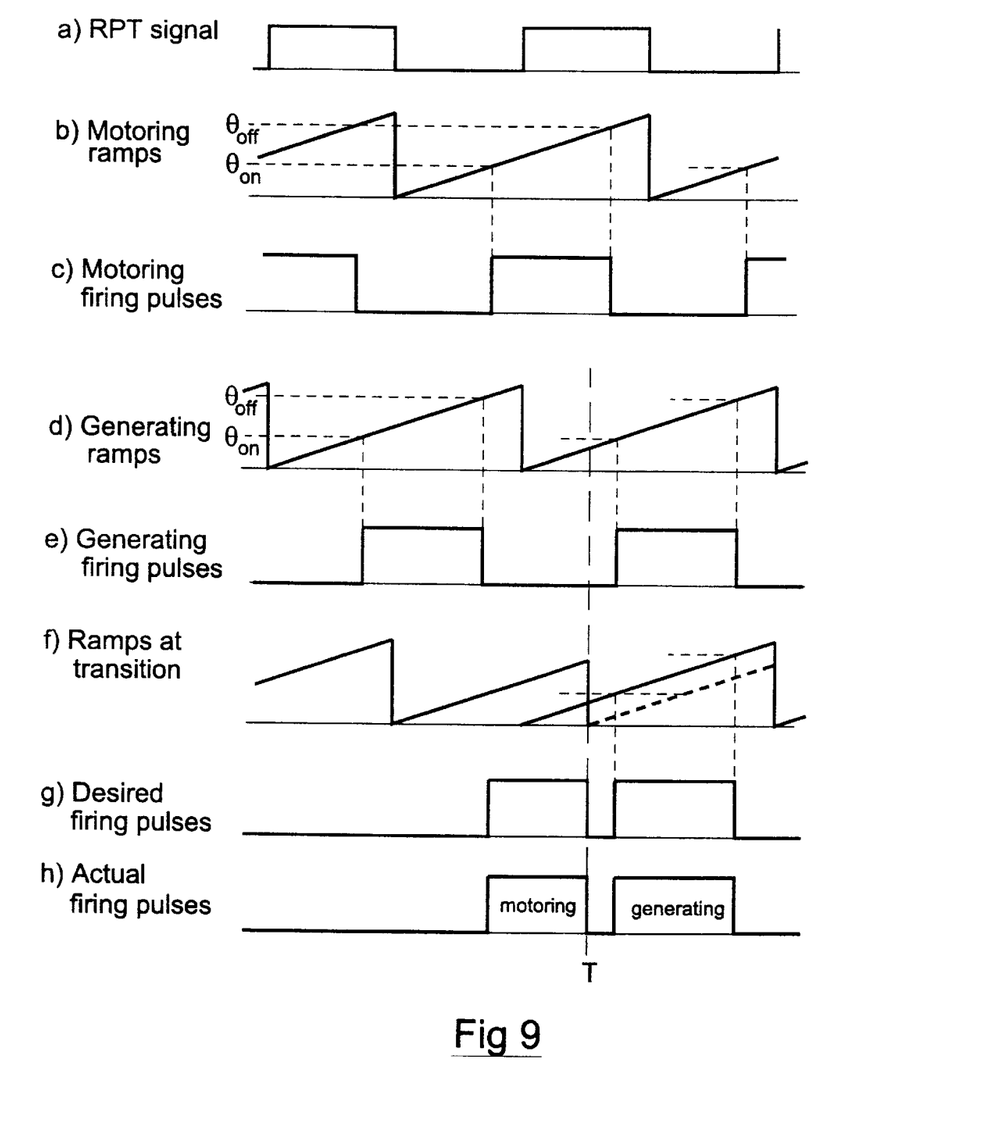
FIG. 9 shows the waveforms in a control system according to an embodiment of the invention.

FIG. 9(d) illustrates the generating ramps initiated at the rising edges of the RPT signal of FIG. 9(a). As with the motoring condition, the thresholds set by the values applied to the comparators 72/74 and slope of the ramp determine $\theta_{ON}$ and $\theta_{OFF}$ for generating. The resultant generating firing pulse is produced by the AND gate 76, as shown in FIG. 9(e).

It will be appreciated that, in operation, both the AND gate 68 and the AND gate 76 produce a continuous stream of firing pulses. A selection has to be made as to which one to use. The selection of motoring or generating is made in the multiplexer 70 by the controller 14 of FIG. 1 selecting the firing pulses from one of the AND gates 68/76 according to a torque sign signal on line 78 according to whether it is desired to run the machine as a motor or a generator. The appropriate firing pulse is output on line 79.

By continuously producing both motoring and generating ramps which are correctly synchronized at all times, and by using a torque sign signal on line 78 to determine whether the system should be motoring or generating, and thereby selecting the firing pulse from the appropriate ramp, the firing pulses produced by embodiments of the invention are always in the correct angular position, regardless of the point at which a transition is made between motoring and generating.

For the purposes of illustration, FIG. 9(f) shows the two correctly timed ramps for motoring and generating. The overlap between the two before point T is the duration by which the generating pulse would be delayed in the prior art, as referred to in relation to FIG. 7.

FIG. 9(g) illustrates the desired pulses changing from motoring to generating at the point T. FIG. 9(h) illustrates the generation of these correctly timed motoring and generating firing pulses according to the invention. The ramp for the firing pulse from the multiplexer 70 for the generating mode is unaffected by the previous ramp for the firing pulse for the motoring mode as each is generated independently. When transition is required (at point T), the change in torque sign ensures that the motoring pulse is terminated and the generating pulse is selected to provide the correct angular position for the demanded generator firing pulse.

By continuously producing both motoring and generating ramps which are correctly synchronized at all times, and by using a torque sign signal to determine whether the system should be motoring or generating and thereby selecting the firing pulse from the appropriate ramp, the firing pulses are always in the correct angular position, regardless of the point at which the transition is made. When a transition from motoring to generating is required, the motoring pulse is de-selected and the generating pulse is selected.

While FIG. 8 shows logic components which may be used to implement the control of an embodiment of the invention in digital form, it will be appreciated that the invention can be implemented in analog form to equal effect, or in a different digital implementation.

It will be appreciated that the circuit shown in FIG. 8 can be duplicated for each phase of the drive system. In the case of a polyphase system, it will be apparent to the skilled person that some components of FIG. 8, e.g. the HF clock, could be made common to all the phases.

If it is desired to introduce a freewheeling period into the conduction cycle (as described above), it will be clear to one skilled in the art that this can be done by the simple addition of logic components to FIG. 8 to modify the firing pulse on line 79 appropriately.

It will be appreciated by one of ordinary skill in the art that the invention is susceptible to various other modifications and variations. Equally, one comparator could be used to compare the ON- and OFF-angles with the motoring and generating ramps in turn, storing the result in a latch which would be accessed by the multiplexer. It would also be possible to use ramps which begin at a predetermined value and decrease with time, or ramps which begin at a value other than zero and increase or decrease with time. In any of these cases, the threshold values for $\theta_{ON}$ and $\theta_{OFF}$ would be changed appropriately. Similarly, it is not necessary for the signals from the RPT to be aligned with the maximum and minimum values of inductance, as any other reference point could be chosen. The above description is provided by way of example and not for the purposes of limitation. The invention is intended to be limited only by the spirit and scope of the following claims.

What is claimed is:

1. A commutation control circuit for an electronically commutated electrical machine having a rotor and a stator, the control circuit comprising:

position detection means for providing a position detection signal indicative of the position of the rotor with respect to the stator;

a motoring timer responsive to the position detection signal for producing motoring firing pulses for a motoring mode of the machine;

a generating timer responsive to the position detection signal for producing generating firing pulses for a generating mode of the machine; and means for selecting between the firing pulses of the motoring and generating timers to produce firing pulses for commutating the machine in one of the motoring and generating modes.

2. A circuit as claimed in claim 1, in which the means for selecting comprises a multiplexer responsive to a selection signal to select between the motoring and generating firing pulses.

3. A circuit as claimed in claim 1 in which at least one of the motoring timer and the generating timer is responsive to the position detection signal for initiating the respective firing pulse and is also responsive to the position detection signal for terminating the respective firing pulse.

4. A circuit as claimed in claim 1 in which the motoring timer comprises:

a ramp generator arranged to start a ramp output in response to the position detection signal at a first predetermined position of the rotor with respect to the stator; and motoring comparator means operable to initiate a motoring firing pulse when the ramp output passes a motoring turn-on threshold value, and further operable thereafter to terminate the motoring firing pulse.

5. A circuit as claimed in claim 4 in which the motoring comparator means is operable to terminate the motoring firing pulse when the ramp output passes a motoring turn-off threshold value.

6. A circuit as claimed in claim 3 in which the generating timer comprises:

a ramp generator arranged to start a ramp output in response to the position detection signal at a second predetermined position of the rotor with respect to the stator; and generating comparator means operable to initiate a generating firing pulse when the ramp output passes a generating turn-on threshold value, and further operable thereafter to terminate the generating firing pulse.

7. A circuit as claimed in claim 6 in which the generating comparator means is operable to terminate the generating firing pulse when the ramp output passes a generating turn-off threshold value.

8. A switched reluctance system comprising:
a reluctance machine having a rotor and a stator and at least one phase winding;
switch means for controlling energization of the or each phase winding; and
a controller arranged to actuate the switch means, the controller including a commutation control circuit as claimed in claim 1, the switch means being responsive to the motoring and generating firing pulses of the commutation control circuit to energize the or each phase winding according to the selected motoring or generating mode.

9. A method of timing commutation in an electrical machine having a rotor and a stator, for motoring or generating, the method comprising:
producing a position detection signal indicative of the position of the rotor with respect to the stator;
producing motoring firing pulses in response to the position detection signal for operating the machine in a motoring mode of the machine;
concurrently generating firing pulses in response to the position detection signal for operating the machine in a generating mode of the machine; and
selecting between the firing pulses of the motoring and generating modes to run the machine in the selected mode.

10. A method as claimed in claim 9, including producing a continuous sequence of motoring firing pulses and, concurrently, producing a continuous sequence of generating firing pulses.

11. A method as claimed in claim 9 in which the production of firing pulses for the motoring and the generating modes further comprises initiating the firing pulses at a first predetermined rotor position.

12. A method as claimed in claim 9 in which the production of the firing pulses for the motoring and/or the generating modes further comprises terminating the firing pulses at a second predetermined rotor position.

13. A commutation control circuit for an electronically commutated electrical machine having a rotor and a stator, the control circuit comprising:
a position detector, the position detector generating a position detection signal indicative of the position of the rotor with respect to the stator;
a motoring timer responsive to the position detection signal for producing motoring firing pulses for a motoring mode of the machine;
a generating timer responsive to the position detection signal for producing generating firing pulses for a generating mode of the machine; and
a selector for selecting between the firing pulses of the motoring and generating timers to produce firing pulses for commutating the machine in one of the motoring and generating modes.

14. A circuit as claimed in claim 13, in which the selector structure comprises a multiplexer responsive to a selection signal to select between the motoring and firing pulses.

15. A circuit as claimed in claim 13 in which at least one of the motoring timer and the generating timer is responsive to the position detection signal for initiating the respective firing pulse and is also responsive to the position detection signal for terminating the respective firing pulse.

16. A circuit as claimed in claim 13 in which the motoring timer comprises:
a ramp generator arranged to start a ramp output in response to the position detection signal at a first predetermined position of the rotor with respect to the stator; and
a motoring comparator constructed to initiate a motoring firing pulse when the ramp output passes a motoring turn-on threshold value, and further operable thereafter to terminate the motoring firing pulse.

17. A circuit as claimed in claim 16 in which the motoring comparator is operable to terminate the motoring firing pulse when the ramp output passes a motoring turn-off threshold value.

18. A circuit as claimed in claim 15 in which the generating timer comprises:
a ramp generator arranged to start a ramp output in response to the position detection signal at a second predetermined position of the rotor with respect to the stator; and
a generating comparator constructed to initiate a generating firing pulse when the ramp output passes a generating turn-on threshold value, and further operable thereafter to terminate the generating firing pulse.

19. A circuit as claimed in claim 18 in which the generating comparator is operable to terminate the generating firing pulse when the ramp output passes a generating turn-off threshold value.

* * * * *

UNITED STATES PATENT AND TRADEMARK OFFICE
CERTIFICATE OF CORRECTION

PATENT NO. : 6,008,615
DATED : December 28, 1999
INVENTOR(S) : David Mark SUGDEN It is certified that error appears in the above-identified patent and that said Letters Patent is hereby corrected as shown below:

In claim 14, line 2, "structure" should be deleted.

Signed and Sealed this

Twenty-fifth Day of July, 2000

Attest:

Q. TODD DICKINSON

*Attesting Officer*                *Director of Patents and Trademarks*